June 21, 1960
L. PÉRAS
2,941,544
FLUID CONTROL DEVICES AND ELASTIC PRESSURE-RESPONSIVE VALVES
Filed Sept. 24, 1956
2 Sheets-Sheet 1
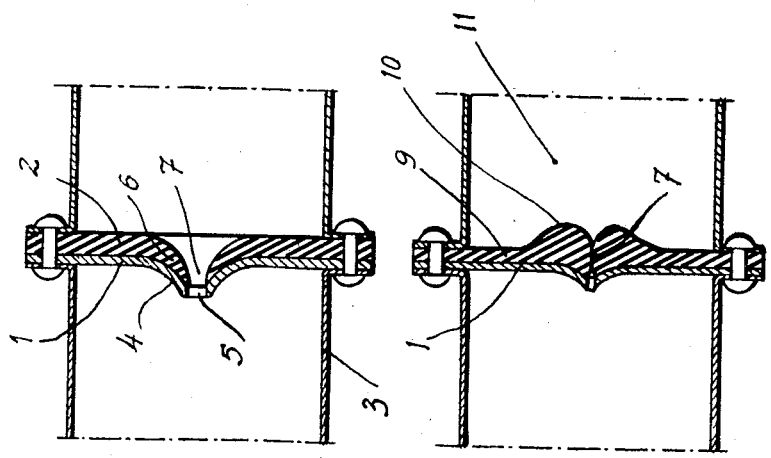
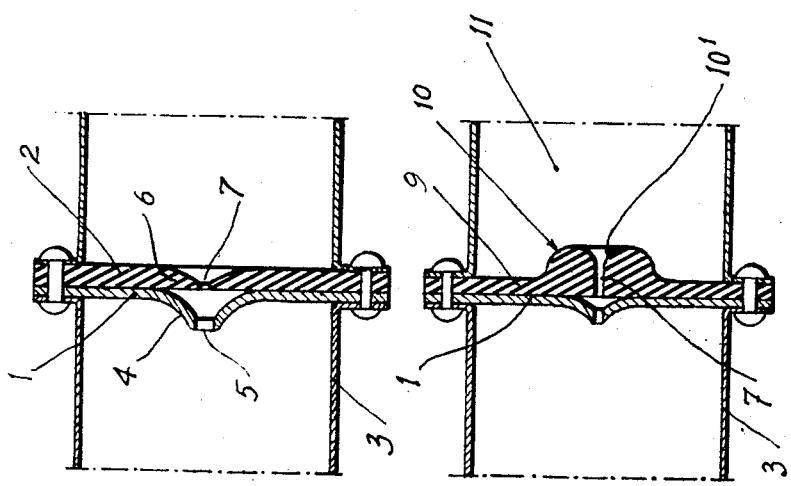

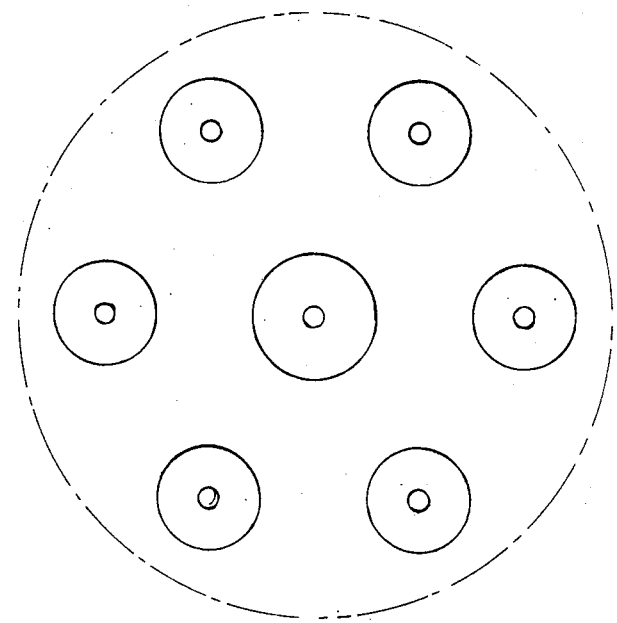
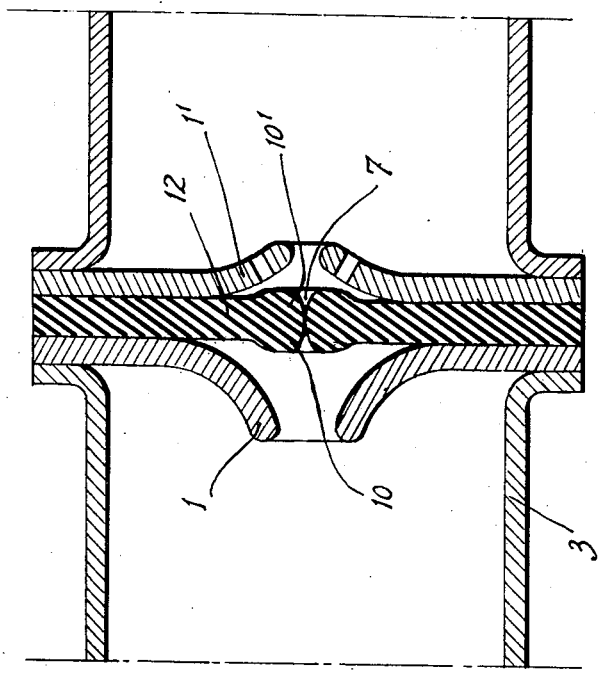

United States Patent Office 2,941,544
Patented June 21, 1960

2,941,544

FLUID CONTROL DEVICES AND ELASTIC PRESSURE-RESPONSIVE VALVES

Lucien Péras, Billancourt, France, assignor to Regie Nationale des Usines Renault, Billancourt, France Filed Sept. 24, 1956, Ser. No. 611,533

Claims priority, application France Sept. 27, 1955

5 Claims. (Cl. 137—525)

This invention relates to fluid control devices and more particularly to valves of elastic material, rubber or plastic, for fluids under pressure and particularly concerns improvements to valve members permitting the creation or the suppression of fluid flow through the valve as a function of pressure.

The improvements of the invention consists in providing, in these valves, which may be of any suitable type, perforations or slits of very small section obtained without removal of material or with only a very slight removal in the regions of pre-determined contour of the valve. The perforations form orifices which remain closed for pressures of fluid below a certain value, for increasing pressures above this value, they open allowing fluid flow of which the flow increases with the pressure. The action of the said valves being due to the effect of variable pressures.

These improvements are advantageously utilised according to the applications where it is desired to obtain a total tightness of a fluid control device for pressures below or equal to a given value and to obtain for higher values of the pressure a flow, or leakage, the amount of which increases with the pressure.

It is likewise possible, using members of suitable shape, to obtain to a certain extent an automatic valve permitting a leakage for a pre-determined pressure or one slightly greater than this, then opposing any passage of fluid when the pressure exceeds a fixed value which may be substantially different from the first one.

These improvements may also be applied to elastic valves intended to be used in a valve body connected to an enclosed space to be controlled. The valve may have to open in order to permit either the outward passage of fluids contained in the enclosed space when the pressure prevailing in the space exceeds a pre-determined value, or in addition, may control the admission of fluids into the enclosed space when a certain pressure drop takes place there.

Finally, valves of this kind may be more particularly adapted with a view to their application in installations comprising a distributor or an apparatus, as for example, a pneumatic jack in which the expanded air after motive action must be rapidly evacuated.

In installations of the type mentioned, it is generally the distributor which evacuates the exhaust air, which has passed through the entire length of piping connecting the distributor to the jack; serious trouble frequently results from this:

First of all an important loss of load which does not facilitate the rapid evacuation of the jack. The movement of the latter cannot then be accomplished in the prescribed time.

Then the volume of this piping may be greater than the capacity of the jack, so that the air will not be renewed, but simply expanded in the piping, this prevents a good lubrication of the cylinder of the jack by means of a lubricator placed on the air supply piping.

Moreover, the fluid control devices or valves, according to the invention, obviate, due to their shape and their elastic construction, the use of metallic parts, such as springs, slide valves, balls, which are often the cause of much trouble as a result of their corrosion. Finally, the replacement of metallic parts by a plastic system forming a valve member enables a system to be obtained which is simpler, more economical, easier to install, which has a greater resistance to wear and which has a greater operating efficiency, particularly where the pressures involved are very small.

In any case, the details of the invention will be more clearly apparent from the several methods of embodiment, which will now be described by way of non-limitative examples and with reference to the annexed drawing, in which:

Fig. 1 is a longitudinal view in section of a control device placed in a pipe and provided at its center with a perforation without removal of material, and illustrates the device in a condition in which it is not being subjected to any pressure or a very slight pressure;

Fig. 2 is a longitudinal sectional view illustrating a valve or device subjected to an air pressure which will give rise to a leakage or flow past the valve member increasing with the pressure;

Fig. 3 is a longitudinal sectional view of a control device having a valve member of a particular shape with a central perforation, illustrating a condition where it is not being subjected to any pressure or a very slight pressure;

Fig. 4 is a longitudinal sectional view illustrating the same device subjected to an air pressure which will give rise to a leakage therethrough for a certain pressure, then will oppose any passage for a greater pressure;

Figs. 5 and 6 are longitudinal sectional views illustrating two other alternatives of embodiment of the control device.

Referring to the drawings and more particularly to Figs. 1 and 2, it will be seen that a partition or backing plate is arranged as support of a valve member 2 in a conduit 3. The partition 1 has, in its central region, a part 4 in the shape of a conical nozzle with orifice 5 to which there corresponds a region of the same shape 6 of the elastic member 2 with a perforation 7 at its center. It is specified that the perforation is made without removal of material, or in special cases with a very slight removal of material. For a very low pressure, the elasticity of the valve member keeps the perforation closed, no leakage takes place. When the pressure increases, the perforation opens slightly and allows a leakage to pass which will increase with the pressure, as is indicated in Fig. 2.

Figs. 3 and 4 show an elastic valve member 9 of a particular shape resting on a support 1. This valve member comprises at its center a perforation 7 bounded by inner marginal edges defining the perforation or slit 7, but it has, in its middle region, a portion 10 of bulbular cross-section or shape with an internal bell-mouth $10^1$, which to a certain extent surrounds the channel or perforation.

In Fig. 3, the pressure of a fluid, for example, air at 11 is zero or very small and there exists a leakage across the passage channel or orifice.

When the pressure increases, it attains a value for which the edges of the channel close and entirely stop up the orifice. The valve has been closed tight in Fig. 4.

The characteristics of the valve members will be a function of the conditions to be realized; profile, thickness, diameter of the perforation, etc. The same will apply for the quality of the valve members which will necessarily be elastic, molded or plastic material. The assembly will likewise correspond to the working condition; flat or concave supports with a central orifice of greater or lesser diameter, etc.

Fig. 5 shows another embodiment in which the valve member 12 has on each side of the end of the orifice 7 a bulbular inner marginal edge portion 10, 10¹, with a bell-mouth. The valve member bearing when it is deformed against the partitions 1, 1¹. The cross-section of individual central passages of these partitions may be different. The bulbular inner marginal portions at the center enables the valve member to operate in two directions.

Of course, a valve member may have any number of orifices such as previously described; in Fig. 6, there has been shown a valve member having a perforation at its center and a series of angularly spaced perforations on its marginal edge portion.

Of course, the present forms of embodiment have been indicated above all by way of example and alternatives can be conceived coming within the scope of the invention.

I claim:

1. A fluid flow control device comprising in combination with means defining a fluid passageway extending therethrough, an elastic member fixed extending transversely of the passageway for selectively stopping fluid from flowing past and for allowing a controlled flow, said passageway defining means including means fixing the elastic member with a fluid-tight seal substantially transversely of the passageway, the elastic member having a central portion of varying cross-section extending transversely of said passageway forming a deflectable portion deflectable in both directions axially of the passageway, the elastic member having inner marginal edge portions jointly defining a central perforation to selectively define an orifice in said elastic member in response to fluid pressure in said passageway and a predetermined fluid pressure closes the slit and another predetermined fluid pressure opens the slit to define said orifice thereby to selectively allow passage of fluid, and two substantially rigid backing members each provided with an orifice of predetermined dimensions and disposed to correspond with the first-mentioned orifice when formed in said elastic member, each of said backing members being disposed on opposite sides of said elastic member and having conical surfaces disposed to limit the lateral deflection of said deflectable portion when it deflects in opposite directions.

2. A fluid flow control device comprising in combination with means defining a fluid passageway extending therethrough, an elastic member fixed extending transversely of the passageway for selectively stopping fluid from flowing past and for allowing a controlled flow, said passageway defining means including means fixing outer marginal edge portions of the elastic member with a fluid-tight seal so that it extends substantially transversely of the passageway, the elastic member having integral central portions having a central perforation and extending transversely of said passageway defining a deflectable portion of varying cross-section and deflectable in at least one direction axially of the passageway, said integral portion having inner marginal edge portions of varying cross-section defining and forming the perforation to selectively define a first orifice in said elastic member in response to fluid pressure in said passageway and a predetermined fluid pressure effective in at least one direction corresponding to the direction of deflection of said deflectable portion closes the perforation and another predetermined fluid pressure opens the perforation to define said orifice to selectively allow passage of fluid, and at least one substantially rigid backing member provided with a second orifice of predetermined dimensions disposed to correspond with the first orifice, and said backing member having conical surfaces disposed to limit the lateral deflection of said deflectable portion.

3. A fluid flow control device according to claim 2, in which said deflectable portion is annular and the inner marginal edge portions defining the perforation extend radially inwardly of the passageway and are tapered in a direction radially inwardly of the passageway and toward said perforation.

4. A fluid flow control device according to claim 2, in which said elastic member has a sleeve portion extending in a direction corresponding with said fluid passageway and said deflectable portion is annular and integral with said sleeve portion, and in which said inner marginal edge portions of said deflectable portion extend radially inwardly of the passageway and have a bulbular cross-section forming said perforation.

5. A fluid flow control device according to claim 4, in which said deflectable portion is provided with an annular recess disposed radially outwardly of said inner marginal edge portions to allow greater and easier deflection of said inner marginal edge portions.

References Cited in the file of this patent

UNITED STATES PATENTS

| | | |
|---|---|---|
| 670,794 | Lott | Mar. 26, 1901 |
| 1,428,399 | Schilling | Sept. 5, 1922 |
| 2,189,084 | Schank | Feb. 6, 1940 |
| 2,389,134 | Brown | Nov. 20, 1945 |
| 2,511,494 | Cohen | June 13, 1950 |
| 2,572,308 | Brown | Oct. 23, 1951 |
| 2,646,063 | Hayes | July 21, 1953 |
| 2,764,183 | Gollehon | Sept. 25, 1956 |
| 2,783,083 | Canter | Feb. 26, 1957 |